(12) United States Patent
Itagaki et al.

(10) Patent No.: US 11,016,675 B2
(45) Date of Patent: May 25, 2021

(54) OPTIMIZING TIMING FOR DATA MIGRATION FROM OLD GENERATION TAPES TO NEW GENERATION TAPES

(71) Applicant: International Business Machines Corporation, Armonk, NY (US)

(72) Inventors: Hiroshi Itagaki, Yokohama (JP); Shinsuke Mitsuma, Machida (JP); Tohru Hasegawa, Tokyo (JP); Tsuyoshi Miyamura, Yokohama (JP); Noriko Yamamoto, Tokyo (JP); Sosuke Matsui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 16/659,911

(22) Filed: Oct. 22, 2019

(65) Prior Publication Data

US 2021/0117105 A1    Apr. 22, 2021

(51) Int. Cl.
*G06F 3/06* (2006.01)

(52) U.S. Cl.
CPC .......... *G06F 3/0617* (2013.01); *G06F 3/0647* (2013.01); *G06F 3/0686* (2013.01)

(58) Field of Classification Search
None
See application file for complete search history.

(56) References Cited

U.S. PATENT DOCUMENTS

| | | | |
|---|---|---|---|
| 9,195,402 B1* | 11/2015 | Hostetter | G11B 5/00813 |
| 10,120,612 B2* | 11/2018 | Hasegawa | G06F 3/0619 |
| 2006/0080500 A1* | 4/2006 | Manthey | G06F 3/0686 711/111 |
| 2006/0101084 A1* | 5/2006 | Kishi | G06F 3/0686 |
| 2012/0163150 A1* | 6/2012 | Itagaki | G06F 3/0607 369/85 |
| 2016/0225403 A1 | 8/2016 | Hostetter | |
| 2017/0153820 A1 | 6/2017 | Hasegawa | |
| 2017/0371887 A1 | 12/2017 | Balasubramanian | |
| 2019/0004714 A1 | 1/2019 | Crawford | |

OTHER PUBLICATIONS

"Physical volume pools", IBM® IBM Knowledge Center, Last printed Oct. 10, 2019, 6 pages, <https://www.ibm.com/support/knowledgecenter/en/STFS69_4.2.0/ts7740_ua_physical_volume_pools.html>.

* cited by examiner

*Primary Examiner* — Michael Alsip
(74) *Attorney, Agent, or Firm* — Edward Li (57) ABSTRACT

A computer-implemented method, a computer program product, and a computer system for optimizing timing for migrating data. The computer system sets a migration required flag for each of first tapes, in response to determining an estimated time period required for data migration from the first tapes to second tapes being smaller than an expiration time period of the first tapes. The computer system sets the migration required flag for a respective one of the first tapes, in response to determining the estimated time period being not smaller than the expiration time period and a predetermined time period has passed for the respective one of the first tapes. Data on tapes that migration required flags are set is to be migrated to the second tapes.

18 Claims, 5 Drawing Sheets

OPTIMIZING TIMING FOR DATA MIGRATION FROM OLD GENERATION TAPES TO NEW GENERATION TAPES

BACKGROUND

The present invention relates generally to migrating data from old generation tapes to new generation tapes, and more particularly to optimizing timing for migrating data from old generation tapes to new generation tapes.

It is known that a tape storage system is good to use for archiving and storing data for a long period. A study reports that data on tape media will retain for more than 50 years. However, tape drives to read/write recorded data and systems including operation systems keep being upgraded. Data migration from tape media of an old generation (which is slow and has low capacity) to one of new generation (which is fast and has high capacity) is planned and executed once in several years (for example once in five years).

Usually, the data migration is time consuming because a lot of data stored on a storage system is migrated. The amount of data is known and the timing to start the data migration is also known; therefore, it is possible to calculate a required period for the data migration by using information such as the data amount and the data transfer speed. There are two possible cases in the data migration. In a first case, for example, daily storage operation is stopped, and operation of the data migration is only carried on. In a second case, for example, the operation of the data migration is executed in parallel to the daily storage operation. In either case, the extra workload is required and it has an impact on the daily storage operation.

SUMMARY

In one aspect, a computer-implemented method for optimizing timing for migrating data is provided. The computer-implemented method comprises determining, by one or more processors, whether an estimated time period required for data migration from first tapes to second tapes is smaller than an expiration time period of the first tapes. The computer-implemented method comprises setting, by the one or more processors, a migration required flag for each of the first tapes, in response to determining the estimated time period being smaller than the expiration time period. The computer-implemented method comprises determining, by the one or more processors, whether a predetermined time period has been passed for a respective one of the first tapes, in response to determining the estimated time being not smaller than the expiration time period. The computer-implemented method comprises setting, by the one or more processors, the migration required flag for the respective one of the first tapes, in response to determining the predetermine time period has passed. In the computer-implemented method, data on tapes that migration required flags are set is to be migrated to the second tapes.

In another aspect, a computer program product for optimizing timing for migrating data is provided. The computer program product comprising one or more computer-readable tangible storage devices and program instructions stored on at least one of the one or more computer-readable tangible storage devices. The program instructions are executable: determine, by one or more processors, whether an estimated time period required for data migration from first tapes to second tapes is smaller than an expiration time period of the first tapes; in response to determining the estimated time period being smaller than the expiration time period, set, by the one or more processors, a migration required flag for each of the first tapes; in response to determining the estimated time being not smaller than the expiration time period, determine by the one or more processors, whether a predetermined time period has been passed for a respective one of the first tapes; in response to determining the predetermined time period has passed, set, by the one or more processors, the migration required flag for the respective one of the first tapes. In the computer program product, data on tapes that migration required flags are set is to be migrated to the second tapes.

In yet another aspect, a computer system for optimizing timing for migrating data is provided. The computer system comprises one or more processors, one or more computer readable tangible storage devices, and program instructions stored on at least one of the one or more computer readable tangible storage devices for execution by at least one of the one or more processors. The program instructions are executable to determine whether an estimated time period required for data migration from first tapes to second tapes is smaller than an expiration time period of the first tapes. The program instructions are further executable to set a migration required flag for each of the first tapes, in response to determining the estimated time period being smaller than the expiration time period. The program instructions are further executable to determine whether predetermined time period has passed for a respective one of the first tapes, in response to determining the estimated time being not smaller than the expiration time period. The program instructions are further executable to set the migration required flag for the respective one of the first tapes, in response to determining the predetermined time period has passed. In the computer system, data on tapes that migration required flags are set is to be migrated to the second tapes.

DETAILED DESCRIPTION

Embodiments of the present invention present an approach to optimizing timing for migrating data from old generation tapes to new generation tapes. In the embodiments, data migrate work is executed as a daily operation and it is not executed at once when an old generation of a storage system is replaced by a new generation of a storage system. For example, a user having a storage system with LTO-5 tape drives (the 5th generation of LTO tape drives) purchases LTO-7 tape drives (the 7th generation of LTO tape drives) and migrates data stored on LTO-5 tapes to LTO-7 tapes. With this approach, it is not necessary to migrate a large amount of data at a time when replacing the old generation of LTO tape drives, so that the burden of migration can be reduced. However, it is difficult to plan which data should be migrated and when the operation of the data migration should be started, because the operation of data migration should keep continuous for longer time period. For example, if the data migration is started earlier, the operation of data migration may be completed while the old generation of LTO tape drives are still usable and is not fully utilized. On the other hand, if the operation of data migration is started late, the operation of data migration may not complete before the date the support of the old generation of LTO tape drives is terminated.

Embodiments of the present invention provide a solution in a case where operation of the data migration is being executed as a part of daily operation. A system of optimizing timing for migrating data monitors usage of the storage system and reports to a user proper timing for starting the data migration; therefore, the user is able to utilize the storage system of the old generation as much as possible and to complete the data migration to the storage system of the new generation before the end of support of the storage system of the old generation.

Figure 1:
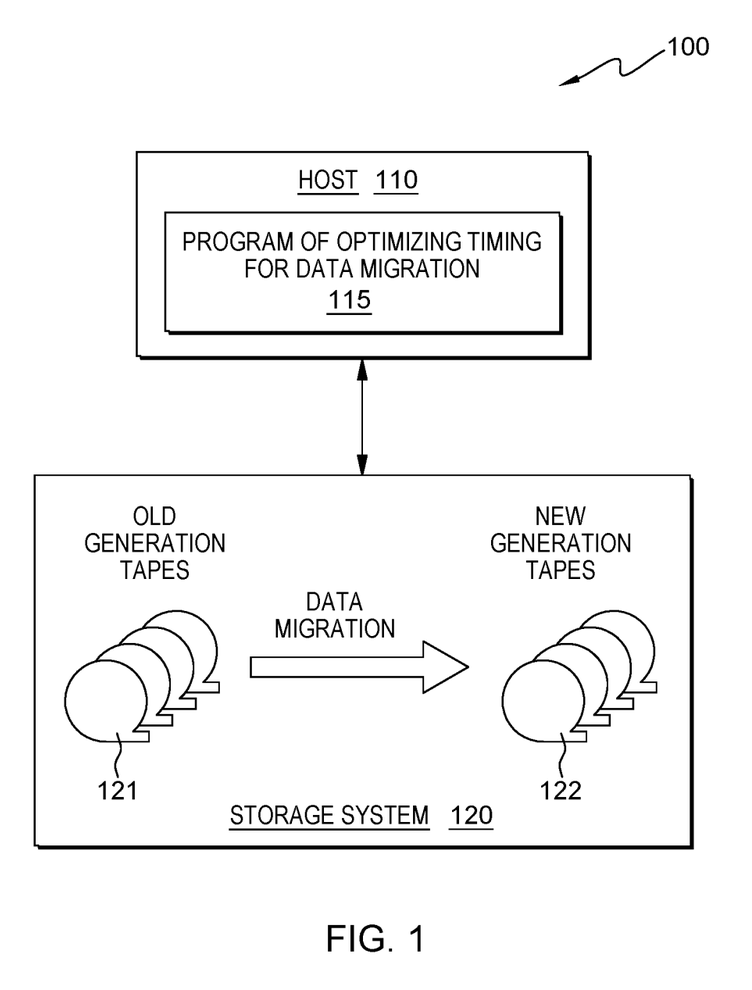
FIG. 1 is a diagram showing a system of optimizing timing for migrating data from old generation tapes to new generation tapes, in accordance with a first embodiment of the present invention.

FIG. 1 is a diagram showing system 100 of optimizing timing for migrating data from old generation tapes to new generation tapes, in accordance with one embodiment of the present invention. In system 100, program 115 of optimizing timing for data migration is located on host 110. Program 115 is responsible for optimizing timing for migrating data from old generation tapes 121 to new generation tapes 122 on storage system 120. Host 110 is a computer or server which will be discussed in detail in later paragraphs with reference to FIG. 4.

Figure 2:
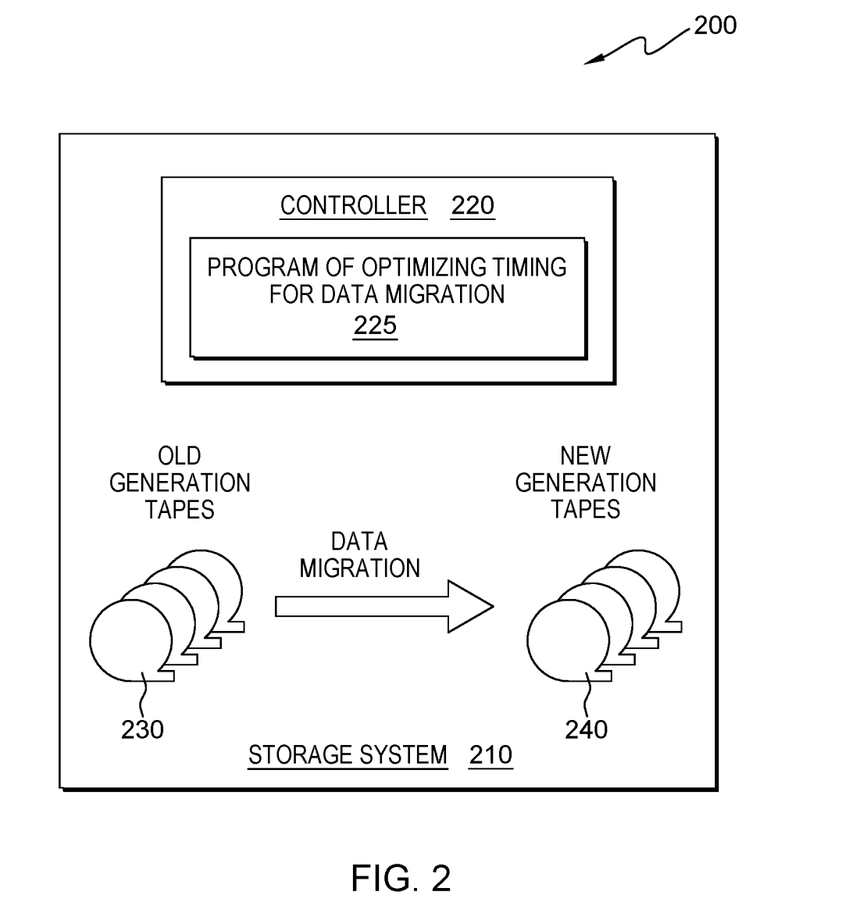
FIG. 2 is a diagram showing a system of optimizing timing for migrating data from old generation tapes to new generation tapes, in accordance with a second embodiment of the present invention.

FIG. 2 is a diagram showing system 200 of optimizing timing for migrating data from old generation tapes to new generation tapes, in accordance with another embodiment of the present invention. In system 200, program 225 of optimizing timing for data migration is located on controller 220 of storage system 210. Program 225 is responsible for optimizing timing for migrating data from old generation tapes 230 to new generation tapes 240 on storage system 210. Controller 220 comprises one or more processors embedded and it is responsible for performing a wide range of functions for the storage system 210. Program 225 is stored on controller 220 for execution by the one of the one or more processors.

System 100 or 200 migrates stored data on the old generation tapes to the new generation tapes automatically. System 100 or 200 utilizes the old generation tapes as much as possible until the end of support date. System 100 or 200 (more particularly, program 115 or 225) calculates the timing of starting the data migration operation so that the data migration operation can be completed by the end of support date, and then system 100 or 200 (more particularly, program 115 or 225) executes the data migrate operation automatically.

System 100 or 200 monitors the following information: (a) the end date of using the old generation tapes, (b) used capacity of old generation tapes and new generation tapes, and (c) data transfer speed of the data migration operation.

By using the above-mentioned information, system 100 or 200 (more particularly, program 115 or 225) starts the data migration operation when it calculates all of data on the old generation tapes cannot be migrated to the new generation by the end date of the use of the old generation tapes.

By using the above-mentioned information (b), system 100 or 200 (more particularly, program 115 or 225) reports to a user, when the available space of the new generation tapes is not enough to store the rest of data on the old generation tapes.

With the present invention, a user is able to use the old generation tapes as much as possible by the end date of its use without preparing any special migration period while executing the data migration operation.

When new generation tapes are introduced, a recording destination of new data is switched to the new generation tapes. When the data migration operation is started, a tape cartridge of an old generation tape becomes a data migration source in the data migration operation. When the data migration operation ends, the tape cartridge of the old generation tape is removed from the storage system.

When efficiency of data migration operation is considered, it is more advantageous to record the new data in the new generation tapes simultaneously as the new generation tapes are introduces. However, the mechanism of this disclosure is applicable even when a policy for continuing to record data on the old generation tapes and the exhausted data capacity of old generation tapes can be reused by the data migration.

For the timing of starting the data migration operation, another timing is sometimes desired to be used in addition to the optimum timing. The data migration is desired to be performed in advance, under conditions that a predetermined time period has passed. The conditions include but not limited to the following examples: (1) a tape cartridge has passed for a certain period since the free capacity of the tape cartridge has become less than a certain amount, and (2) a tape cartridge has passed for a certain period since the last access such as read or write.

In a following example, which is under the condition that a tape cartridge new reading or writing access has not performed for a certain period time since the last access, the date migration operation is triggered because of the condition rather than the end date of using the old generation tapes or the expiration date.

For a tape that is left untouched for a long period of time, for example, eighteen months or more after the last access, it is better to attempt access to data even when it is unnecessary in order to confirm that the data on the tape can be read. By performing the data migration at that timing, access to all data on the tape is carried out.

In this case, besides the information (a), (b), and (c) mentioned in a previous paragraph, system 100 or 200 monitors the following information: (d) an allowable maximum value of a period in which there is no access to each tape and (e) elapsed time after the last access of data on each tape.

System 100 or 200 uses information (d) and (e) mentioned above to determine whether the elapsed time after the last access of data on each tape exceeds the allowable maximum value. When determining the elapsed time after the last access of data on each tape exceeds the allowable maximum value, system 100 or 200 starts to carry out the data migration operation.

Technology Number (T):

The technology numbers are set for different generations of tape cartridges. The technology numbers are set such that a smaller technology number is set for an older generation of tape cartridges. For example, when there are a fifth generation and a seventh generation of LTO tape cartridges, the technology numbers are defined as shown in Table 1. In the case of tape cartridges supporting a plurality of formats, it is desirable to also define tape cartridges of different formats with different technology numbers.

TABLE 1

| Technology Number | Tape Cartridge Type | Explanation |
|---|---|---|
| 10 | LTO-5 | LTO Fifth Generation |
| 30 | LTO-7 | LTO Seventh Generation |

Use End Deadline Date and Time E(T) of Technology Number T:

In a configuration file of system 100 or 200, a user is enabled to freely set the use end deadline date and time for a technology number representing a generation of tape cartridges. When system 100 or 200 is used, the use end deadline date has only to be set by considering roadmap of tape storage used, future release plans, and budgets. In the following description, the use end deadline date and time of the technology number T is represented as E(T).

Allowable Maximum Value M(T) of a Time Period when there is No Data Access in the Technology Number T:

In a configuration file of system 100 or 200, a user can freely set the allowable maximum value. An upper limit is provided for the time period when there is no data access to the storage medium with the technology number T. The user sets the allowable maximum value when the user desires to carry out migration regardless of the end deadline date and time of the technology number. This is only an example; a condition for starting the data migration may be set without being limited to the allowable maximum value. In the following description, the allowable maximum value of a time period when there is no data access in the technology number T is represented as M(T).

Processing Speed R(T1, T2) of the Data Migration:

System 100 or 200 records a start time and an end time, and calculates average transfer speed by dividing an amount of transferred data by a difference between the start time and the end time. The amount of migrating data can be calculated from a record for each cartridge described below. The average transfer speed is transfer speed in the entire storage system (all pairs of drives) rather than in each pair of drives (a drive for reading and a drive for writing). In the following description, the average transfer speed from tapes of the technology number T1 to tapes of the technology number T2 is represented as R(T1, T2).

System 100 or 200 updates R(T1, T2) using a new result every time the data transfer from a tape of the technology number T1 to a tape of the technology number T2 is completed. As preliminary measures against a sudden data increase or a sudden processing speed decrease due to some reasons in the future, the processing speed R(T1, T2) used for calculation may be set lower than actual processing speed (e.g., the processing speed R(T1, T2) may be set approximately 10% the actual processing speed); by doing so, the start time of the data migration may be set to an earlier time and give a margin to an execution period of the data migration.

Considering the possibility of various overheads due to characteristics of the storage system and target data, system 100 or 200 sets an initial value of the processing speed R(T1, T2) sufficiently smaller than a maximum transfer rate design value of a pair of drives; for example, approximately 10% maximum transfer rate design value is set as the processing speed R(T1, T2).

Notification of Cartridge Unmount:

After a tape drive is used and before issuing a request for unmounting a tape cartridge from the tape drive, system 100 or 200 inquires the tape drive about a remaining capacity, using an SCSI (Small Computer System Interface) command. When a reply is obtained, system 100 or 200 records the remaining capacity and a timestamp for each tape cartridge. Table 2 is an example of a tape cartridge management table.

TABLE 2

| Technology Number | Cartridge Name | Total Capacity | Remaining Capacity | Last Access Data/Time | Migration Required |
|---|---|---|---|---|---|
| 10 | YAM001L5 | 1500 | 89 | 2018-12-10T16:30:00 | |
| 10 | YAM002L5 | 1500 | 97 | 2018-12-31T23:25:54 | |

When system 100 or 200 does not actively issue a request for unmounting the tape cartridge, a function of notifying the storage system when the drive is requested to unmount the tape cartridge is added to the drive. For example, when Spectrum Archive LE is used, a cartridge in the drive is automatically unloaded and a necessary tape is mounted when a tape recording a file, to which the storage system requests access, is not mounted in the drive. In this case, system 100 or 200 does not directly request the unmount of the tape cartridge.

Necessity Check of Data Migration:

System 100 or 200 carries out necessity check of data migration periodically (e.g., at 02:00 a.m. every day). First, for all cartridges of the same technology number in Table 2, a total used capacity of the cartridges, S(T), is calculated by system 100 or 200. System 100 or 200 calculates the time required for migrating all data by dividing S(T) by R(T, Tn), where Tn is a technology number of a data migration destination. System 100 or 200 compares a predicted date and time Es(T) of completing data migration and the use end deadline date and time E(T), using a result of the calculation. The time difference between the detection of the necessity of migration by the system and the preparation of the environment in which the system can perform the migration (for example the purchase time of the cartridge) are checked. In consideration of the execution period, prediction error, etc., comparison may be made by the date and time obtained by subtracting the assumed time difference from E(T). For example, a 30-day buffer is provided; the date and time one month before the use end date and time E(T) is compared with Es(T).

An increase of S(T) may also be recorded to perform comparison considering a data increase in the future. In this case, when a remaining period from the present to the use end date and time is represented as t (day) and a data increase average of one day is represented as s from records in the past, a total data on the old generation tapes until the use end deadline is S(T)+s×t. Therefore, the migration completion predicted date and time Es(T) can be calculated by (S(T)+s×t)/R(T, Tn).

When Es(T) is larger than E(T), system 100 or 200 sets a "migration required" flag shown in Table 2 for all the cartridges with the technology number T. Otherwise, an elapsed time L from last data access and M(T) are compared for each of cartridges. When M(T) is smaller for a cartridge, system 100 or 200 sets the migration required flag for the cartridge.

Subsequently, system 100 or 200 calculates a sum of data Sm(T) of the cartridges for which the migration required flag is set among the cartridges having the technology number T. At the same time, system 100 or 200 calculates a sum of free spaces Se(Tn) of the cartridges having the migration destination technology number Tn. System 100 or 200 compares Sm(T) and Se(Tn). When Se(Tn) of the data migration destination is smaller than Sm(T), system 100 or 200 issues an alert to inform a user (or an administrator) that the capacity of a migration destination tape storage is insufficient. When Se(Tn) of the migration destination tape storage is sufficient, system 100 or 200 carries out the data migration processing for the cartridges that the migration required flags are set.

Figure 3A:
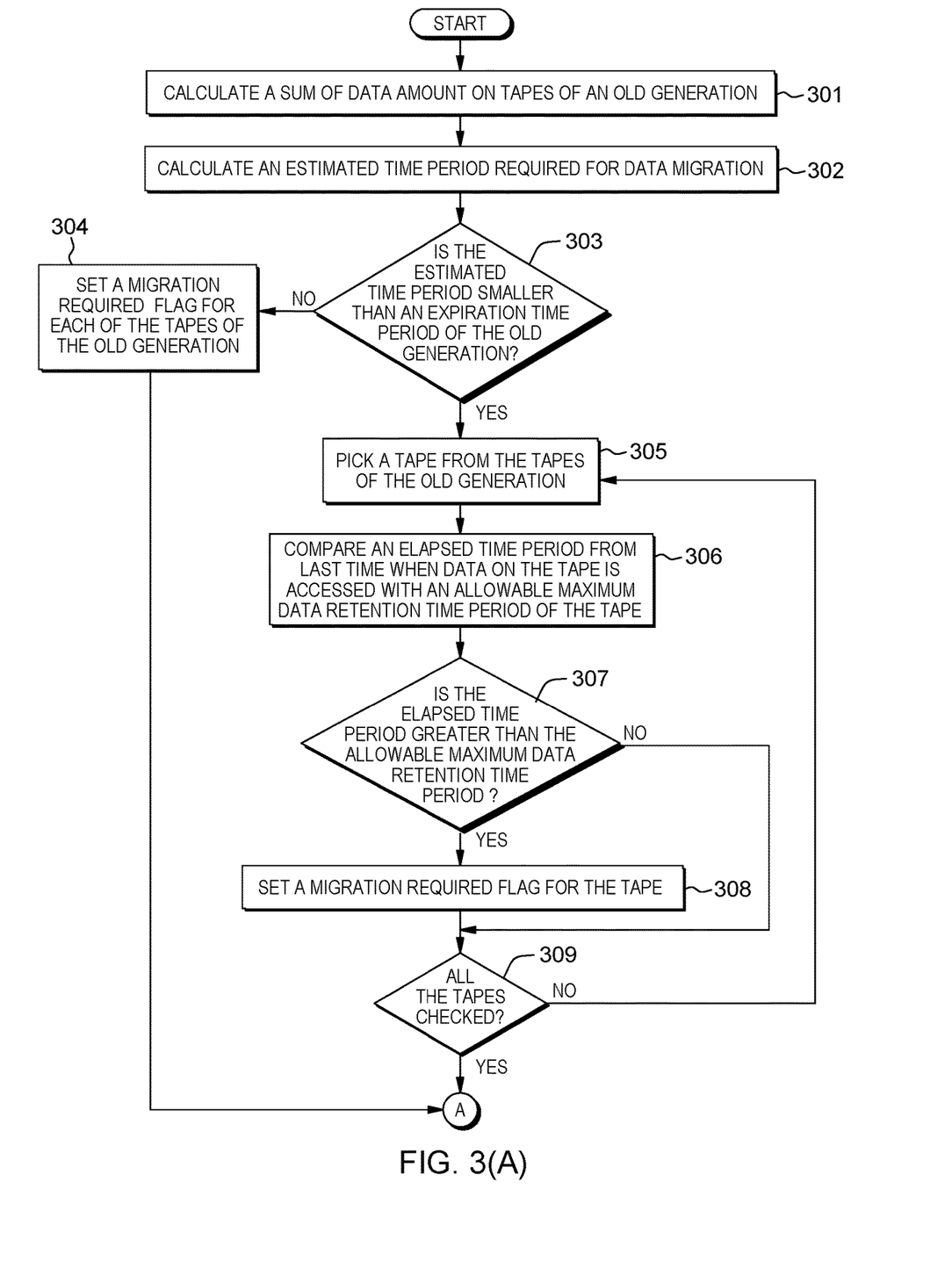
FIG. 3(A) and FIG. 3(B) present operational steps of optimizing timing for migrating data from old generation tapes to new generation tapes, in accordance with one embodiment of the present invention.
Figure 3B:
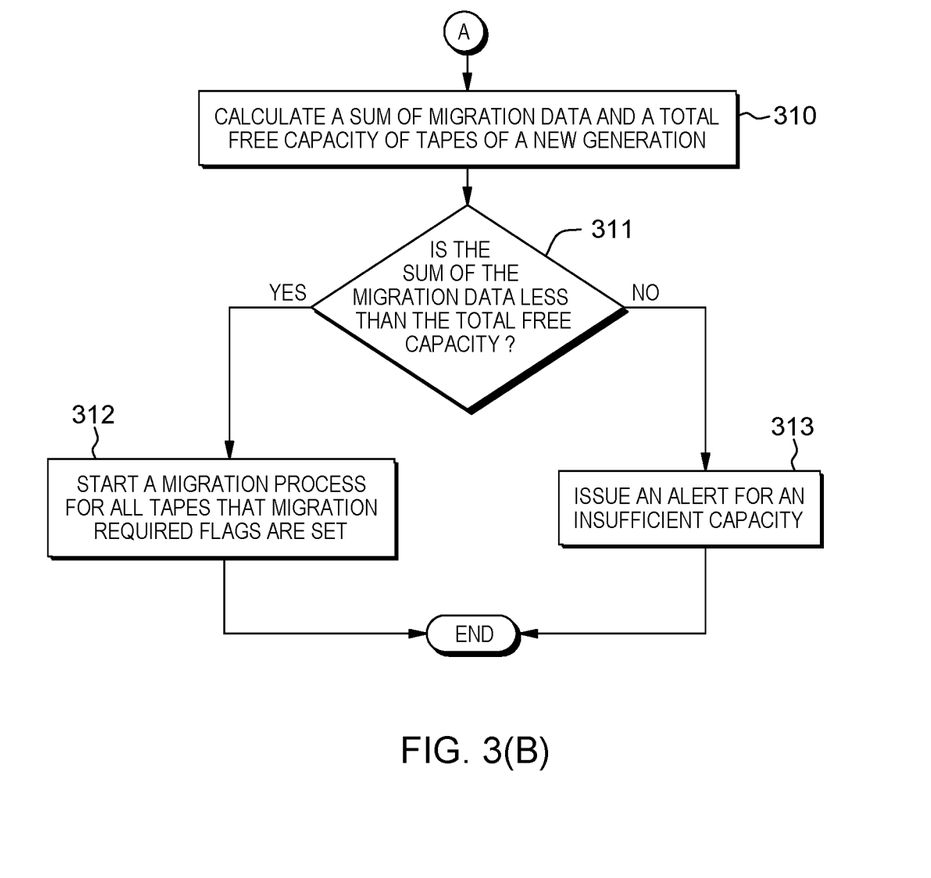

FIG. 3(A) and FIG. 3(B) present operational steps of optimizing timing for migrating data from old generation tapes to new generation tapes, in accordance with one embodiment of the present invention. In one embodiment of the present invention, the operational steps are implemented by a program for optimizing timing for migrating data and the program is located on a host; for example, as shown in FIG. 1, program 115 of optimizing timing for data migration is located on host 110, and program 115 is responsible for optimizing timing for migrating data from old generation tapes 121 to new generation tapes 122 on storage system 120. In another embodiment of the present invention, the operational steps are implemented by a program located on a controller of a storage system; for example, as shown in FIG. 2, program 225 of optimizing timing for data migration is located on controller 220 of storage system 210, and program 225 is responsible for optimizing timing for migrating data from old generation tapes 230 to new generation tapes 240 on storage system 210.

At step 301, one or more processors calculate a sum of data amount on tapes of an old generation. As mentioned previously in this document, the sum of data amount is denoted as S(T). T represents a technology number; for example, as shown in Table 1, the technology number of LTO Fifth Generation (LTO-5) is 10.

At step 302, the one or more processors calculate an estimated time period required for data migration from tapes of an old generation to tapes of a new generation. As mentioned previously in this document, the estimated time period required for data migration is denoted as Es(T). The estimated time period required for data migration is calculated by $$Es(T) = \frac{S(T)}{R(T, Tn)}$$

where R(T, Tn) is the average transfer speed from a tape of the old generation with the technology number T to a tape of the new generation with the technology number Tn.

At step 303, the one or more processors determines whether the estimated time period required for data migration is smaller than an expiration time period of the tapes of the old generation (or the use end deadline date and time E(T) of technology number T); in other words, the one or more processors determines whether Es(T)<E(T).

In response to determining that the estimated time required for data migration is smaller than the expiration time period of the tapes of the old generation or Es(T)<E(T) (YES branch of step 303), the one or more processors at step 305 picks a tape from the tapes of the old generation.

At step 306, the one or more processors compare an elapsed time period (L) from last time when data on the tape is accessed with an allowable maximum data retention time period (M(T)) of the tape; in other words, the one or more processors compare L with M(T). L and M(T) have been mentioned previously in this document.

At step 307, the one or more processors determines whether the elapsed time period is greater than the allowable maximum data retention time period of the tape. In other words, the one or more processors determines whether L>M(T).

In response to determining that the elapsed time period is greater than the allowable maximum data retention time period of the tape or L>M(T) (YES branch of step 307), the one or more processors at step 308 set a migration required flag for the tape which is picked at step 305. Then, at step 309, the one or more processors determines whether all the tapes of the old generation are checked or picked.

In response to determining that the elapsed time period is not greater than the allowable maximum data retention time period of the tape (NO branch of step 307), the one or more processors execute step 309 mentioned above.

In response to determining that not all the tapes of the old generation are checked or picked (NO branch of step 309), the one or more processors reiterate step 305, at which the one or more processors pick a next tape from remaining tapes of the old generation.

In response to determining that all the tapes of the old generation are checked or picked (YES branch of step 309), the one or more processors at step 310 calculate a sum of migration data (to-be-migrated data) and a total free capacity of tapes of a new generation. As mentioned previously in this document, a sum of migration data is denoted by Sm(T), and a total free capacity of tapes of a new generation is denoted by Se(Tn).

At step 311, the one or more processors determine whether the sum of the migration data is less than the total free capacity of the tapes of the new generation; in other words, the one or more processors determine whether Sm(T)<Se(Tn).

In response to determining that the sum of the migration data is less than the total free capacity of the tapes of the new generation (YES branch of step 311), at step 312, the one or more processors start a migration process for tapes that the migration required flags are set.

In response to determining that the sum of the migration data is not less than the total free capacity of the tapes of the new generation (NO branch of step 311), the one or more processors at step 313 issue an alert for an insufficient capacity of the tape of the new generation.

Referring to FIG. 3(A), in response to determining that the estimated time required for data migration is not smaller than the expiration time period of the tapes of the old generation (NO branch of step 303), the one or more processors at step 304 set a migration required flag for each of the tapes of the old generation. Then, the one or more processors execute step 310 (shown in FIG. 3(B)) and other following appropriate steps (shown in FIG. 3(B)).

Specific Use Case:

For example, when a support end of LTO fifth generation (LTO-5) is seven years later, a use end of LTO-5 is set to six years later and a technology of a migration destination is assumed to be LTO seventh generation (LTO-7). An initial value of migration processing speed from LTO-5 to LTO-7 is set to 14 MB/s, which is 10% of 140 MB/s, because readout speed of LTO-5 is a maximum value. Thereafter, data is accumulated using a system of the LTO-5. If data of 30 TB (equivalent to ten tapes) is accumulated in one month, rough estimates of an accumulated total data amount S(T=LTO5) and time necessary for migration calculated at processing speed R are as shown in Table 3. In this example, comparison considering an increase in a data amount is not performed.

Table 3

|  | First Year | Second Year | Third Year | Fourth Year |
|---|---|---|---|---|
| Data Amount | 360 T | 720 T | 1080 T | (1440 T) |
| Migration Prediction Period | 0.8 Years | 1.63 Years | 2.45 Years | (3.26 Years) |
| Period Until a Use End Deadline | 5.0 Years | 4.0 Years | 3.0 Years | 2.0 Years |

Accordingly, in this example, an alert is issued at a point in time a little bit after the third year. The user (or the administrator) upgrades a half of drives to, for example, LTO-7 and adds an LTO7 cartridge to a library. When a sufficient migration destination free space is prepared, the data migration processing is automatically executed. When the data migration processing is started, since a total data amount recorded in the old technology decreases, a data amount, and a migration predicted period in the fourth year are actually smaller than values in Table 3.

When an allowable maximum value of a period in which there is no access to a storage medium is additionally used as a trigger for a start of migration, an alert is likely to be issued at earlier timing. In this way, the user (the administrator) is capable of gradually migrating data to a tape of the new LTO-7 technology while sufficiently using a tape of the LTO-5 technology.

Additional Matters:

Since drives and tape cartridges are used for the data migration processing, the number of drives usable by the system decreases during the data migration processing. To avoid this problem, it is also conceivable to limit a time period of the data migration processing. In this case, a data migration executable time is reflected during the calculation of Es(T).

In another solution, it is also possible to adopt a method of limiting the number of drives used for the data migration rather than the time period. In this case, since a transfer rate R(T1, T2) updated at any time results in the limited number of drives, so it is sufficient to continue using this value of the transfer rate.

Further, it is also conceivable to adopt a mechanism for monitoring a use status of the drives in the system and increasing or decreasing the number of drives that can be used. For example, when drive use rates of a system with four tape drives of the old generation including one drive for data migration are respectively 20%, one more tape drive may be used as a tape drive for data migration.

Figure 4:
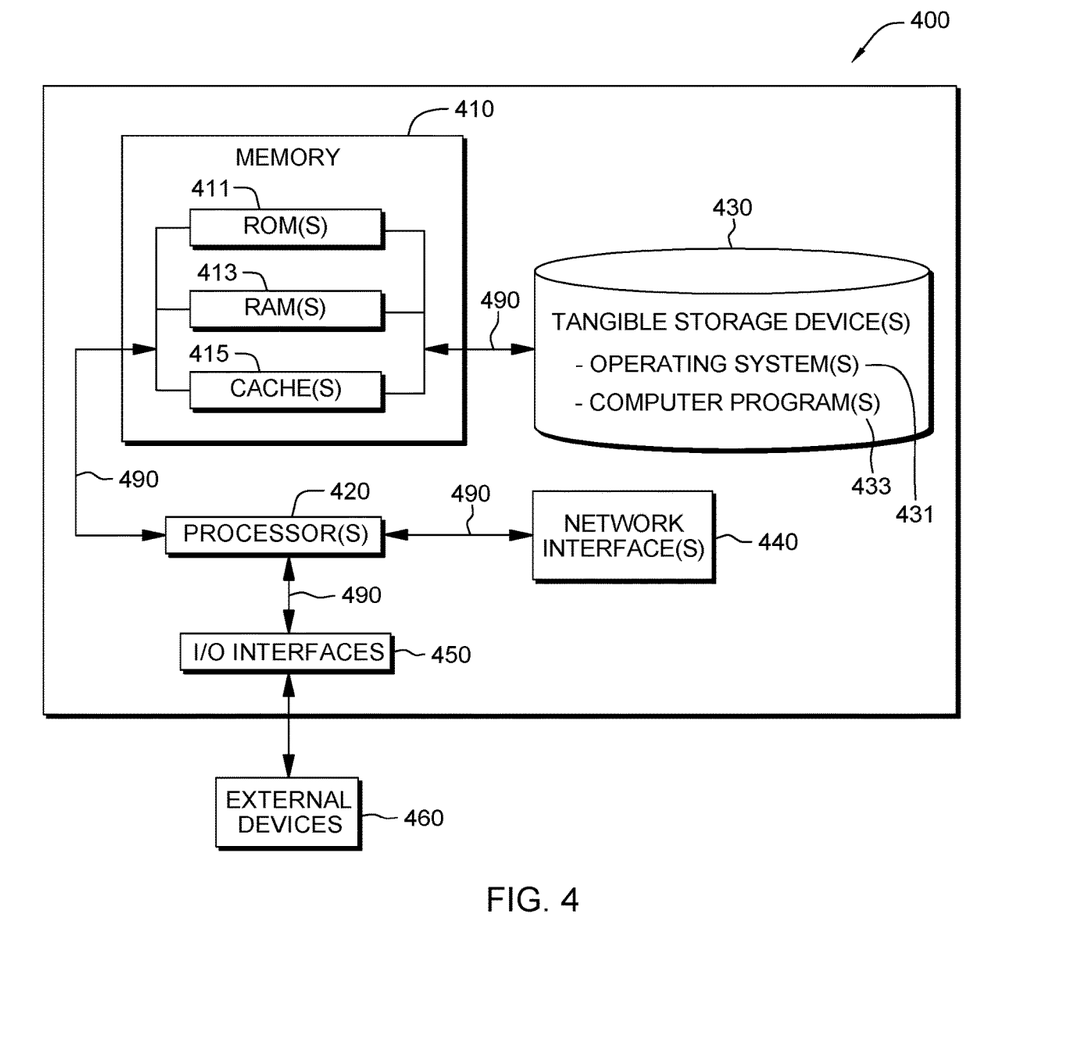
FIG. 4 is a diagram illustrating components of a computer device, in accordance with one embodiment of the present invention.

FIG. 4 is a diagram illustrating components of computer device 400, in accordance with one embodiment of the present invention. It should be appreciated that FIG. 4 provides only an illustration of one implementation and does not imply any limitations with regard to the environment in which different embodiments may be implemented.

Referring to FIG. 4, computer device 400 includes processor(s) 420, memory 410, and tangible storage device(s) 430. In FIG. 4, communications among the above-mentioned components of computer device 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430.

Computer device 400 further includes I/O interface(s) 450. I/O interface(s) 450 allows for input and output of data with external device(s) 460 that may be connected to computer device 400. Computer device 400 further includes network interface(s) 440 for communications between computer device 400 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

What is claimed is:

1. A computer-implemented method for optimizing timing for migrating data, the method comprising:
    determining, by one or more processors, whether an estimated time period required for data migration from first tapes to second tapes is smaller than an expiration time period of the first tapes;
    in response to determining the estimated time period being smaller than the expiration time period, setting, by the one or more processors, a migration required flag for each of the first tapes;
    in response to determining the estimated time period being not smaller than the expiration time period, determining, by the one or more processors, whether a predetermined time period has passed for a respective one of the first tapes;
    in response to determining the predetermined time period having passed, setting, by the one or more processors, the migration required flag for the respective one of the first tapes; and
    wherein data on tapes that migration required flags are set is to be migrated to the second tapes.

2. The computer-implemented method of claim 1, further comprising:
    calculating, by the one or more processors, a sum of data amount on the first tapes; and
    calculating, by the one or more processors, the estimated time period required for data migration, by dividing the sum of data amount on the first tapes by an average transfer rate from the first tapes to the second tapes.

3. The computer-implemented method of claim 1, further comprising:
    picking, by the one or more processors, a tape from the first tapes, for determining whether the tape is to be set the migration required flag;
    comparing, by the one or more processors, the predetermined time period of the tape and an allowable data retention time period of the tape;
    determining, by the one or more processors, whether all of the first tapes are picked; and
    in response to determining not all of the first tapes being picked, picking another tape from the first tapes until all the first tapes are picked.

4. The computer-implemented method of claim 1, further comprising:
    calculating, by the one or more processors, a sum of to-be-migrated data and a total free capacity of the second tapes; and
    determining, by the one or more processors, whether the sum of the to-be-migrated data is less than the total free capacity of the second tapes.

5. The computer-implemented method of claim 4, further comprising:
    in response to determining the sum of the to-be-migrated data being less than the total free capacity of the second tapes, starting, by the one or more processors, a migration process for the tapes that the migration required flags are set.

6. The computer-implemented method of claim 4, further comprising:
    in response to determining the sum of the to-be-migrated data being not less than the total free capacity of the second tapes, issuing, by the one or more processors, an alert for an insufficient capacity of the second tapes.

7. A computer program product for optimizing timing for migrating data, the computer program product comprising one or more computer-readable tangible storage devices and program instructions stored on at least one of the one or more computer-readable tangible storage devices, the program instructions executable to:
determine, by one or more processors, whether an estimated time period required for data migration from first tapes to second tapes is smaller than an expiration time period of the first tapes;
in response to determining the estimated time period being smaller than the expiration time period, set, by the one or more processors, a migration required flag for each of the first tapes;
in response to determining the estimated time period being not smaller than the expiration time period, determine, by the one or more processors, whether a predetermined time period has passed for a respective one of the first tapes;
in response to determining the predetermined time period having passed, set, by the one or more processors, the migration required flag for the respective one of the first tapes; and
wherein data on tapes that migration required flags are set is to be migrated to the second tapes.

8. The computer program product of claim 7, further comprising the program instructions executable to:
calculate, by the one or more processors, a sum of data amount on the first tapes; and
calculate, by the one or more processors, the estimated time period required for data migration, by dividing the sum of data amount on the first tapes by an average transfer rate from the first tapes to the second tapes.

9. The computer program product of claim 7, further comprising the program instructions executable to:
pick, by the one or more processors, a tape from the first tapes, for determining whether the tape is to be set the migration required flag;
compare, by the one or more processors, the predetermined time period of the tape and an allowable data retention time period of the tape;
determine, by the one or more processors, whether all of the first tapes are picked; and
in response to determining not all of the first tapes being picked, pick another tape from the first tapes until all the first tapes are picked.

10. The computer program product of claim 7 further comprising the program instructions executable to:
calculate, by the one or more processors, a sum of to-be-migrated data and a total free capacity of the second tapes; and
determine, by the one or more processors, whether the sum of the to-be-migrated data is less than the total free capacity of the second tapes.

11. The computer program product of claim 10, further comprising the program instructions executable to:
in response to determining the sum of the to-be-migrated data being less than the total free capacity of the second tapes, start, by the one or more processors, a migration process for the tapes that the migration required flags are set.

12. The computer program product of claim 10, further comprising the program instructions executable to:
in response to determining the sum of the to-be-migrated data being not less than the total free capacity of the second tapes, issue, by the one or more processors, an alert for an insufficient capacity of the second tapes.

13. A computer system for optimizing timing for migrating data, the computer system comprising:
one or more processors, one or more computer readable tangible storage devices, and program instructions stored on at least one of the one or more computer readable tangible storage devices for execution by at least one of the one or more processors, the program instructions executable to:
determine, by one or more processors, whether an estimated time period required for data migration from first tapes to second tapes is smaller than an expiration time period of the first tapes;
in response to determining the estimated time period being smaller than the expiration time period, set, by the one or more processors, a migration required flag for each of the first tapes;
in response to determining the estimated time period being not smaller than the expiration time period, determine, by the one or more processors, whether a predetermined time period has passed for a respective one of the first tapes;
in response to determining the predetermined time period having passed, set, by the one or more processors, the migration required flag for the respective one of the first tapes; and
wherein data on tapes that migration required flags are set is to be migrated to the second tapes.

14. The computer system of claim 13, further comprising the program instructions executable to:
calculate, by the one or more processors, a sum of data amount on the first tapes; and
calculate, by the one or more processors, the estimated time period required for data migration, by dividing the sum of data amount on the first tapes by an average transfer rate from the first tapes to the second tapes.

15. The computer system of claim 13, further comprising the program instructions executable to:
pick, by the one or more processors, a tape from the first tapes, for determining whether the tape is to be set the migration required flag;
compare, by the one or more processors, the predetermined time period of the tape and an allowable data retention time period of the tape;
determine, by the one or more processors, whether all of the first tapes are picked; and
in response to determining not all of the first tapes being picked, pick another tape from the first tapes until all the first tapes are picked.

16. The computer system of claim 13, further comprising the program instructions executable to:
calculate, by the one or more processors, a sum of to-be-migrated data and a total free capacity of the second tapes; and
determine, by the one or more processors, whether the sum of the to-be-migrated data is less than the total free capacity of the second tapes.

17. The computer system of claim 16, further comprising the program instructions executable to:
in response to determining the sum of the to-be-migrated data being less than the total free capacity of the second tapes, start, by the one or more processors, a migration process for the tapes that the migration required flags are set.

18. The computer system of claim 16, further comprising the program instructions executable to:
in response to determining the sum of the to-be-migrated data being not less than the total free capacity of the second tapes, issue, by the one or more processors, an alert for an insufficient capacity of the second tapes.

\* \* \* \* \*